United States Patent Office 3,464,977
Patented Sept. 2, 1969

3,464,977
5-(AMINO-LOWERALKYL)-4,5-DIHYDROTHIENO-[2,3-b]BENZOTHIAZEPIN-4-ONES
Jany Renz, Basel, Jean Pierre Bourquin, Magden, Hans Winkler, Basel, and Pierre Gagnaux and Gustav Schwarb, Allschwil, Switzerland, assignors to Sandoz Ltd. (also known as Sandoz A.G.), Basel, Switzerland
No Drawing. Filed Dec. 21, 1966, Ser. No. 603,455
Claims priority, application Switzerland, Dec. 23, 1965, 17,750/65; June 7, 1966, 8,222/66; Oct. 27, 1966, 15,596/66, 15,597/66
Int. Cl. C07d 41/06
U.S. Cl. 260—239.3                         17 Claims ABSTRACT OF THE DISCLOSURE
Heterocyclic compounds of the general formula

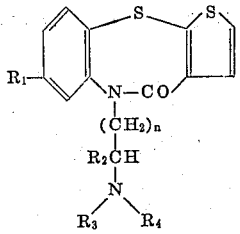

in which $R_1$ is hydrogen, chlorine, bromine or iodine, and either $n$ is 1 to 2, $R_2$ is hydrogen, and each of $R_3$ and $R_4$ is alkyl of 1 to 4 carbon atoms, or $R_3$ and $R_4$ together with the nitrogen are piperazinyl-4, which may optionally be substituted in the 1-position by alkyl of 1 to 4 carbon atoms, or $n$ is 2, and $R_4$ is alkyl of 1 to 4 carbon atoms, and $R_3$ together with $R_2$ are trimethylene of tetramethylene, and the pharmaceutically acceptable acid addition salts thereof. Also the compound of the general formula:

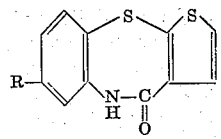

in which R is hydrogen, chlorine, bromine or iodine, alkyl, alkoxy, alkylthio, alkylsulphonyl or alkylsulphinyl of 1 to 4 carbon atoms, trifluoromethyl or cyano. These compounds are useful in the treatment of psychic depression conditions and psychosomatic illnesses. They may also be used as antihistamines.

The present invention relates to new heterocyclic compounds and a process for their production.
The present invention provides compounds of general Formula I,

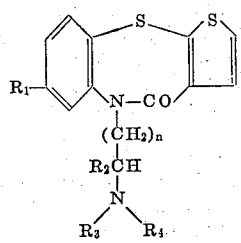

in which $R_1$ signifies a hydrogen, chlorine, bromine or iodine atom, and either $n$ signifies 1 or 2, $R_2$ signifies a hydrogen atom, and each of $R_3$ and $R_4$ signifies an alkyl radical having 1 to 4 carbon atoms, or $R_3$ and $R_4$ together with the nitrogen atom signify a piperazinyl-4 radical which may optionally be substituted in the 1-position by an alky radical having 1 to 4 carbon atoms, or $n$ signifies 2, and $R_4$ signifies an alkyl radical having 1 to 4 carbon atoms, and $R_3$ together with $R_2$ forms a trimethylene or tetramethylene chain, and their acid addition salts.

The present invention further provides a process for the production of compounds of general Formula I and their acid addition salts, characterized in that a compound of general Formula II,

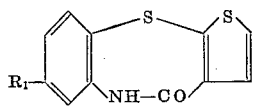

in which $R_1$ has the above significance, is reacted with a compound of general formula III,

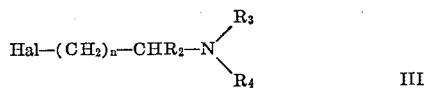

in which $R_2$, $R_3$, $R_4$ and $n$ have the above significance, and Hal signifies a chlorine or bromine atom, in an organic solvent which is inert under the reaction conditions, in the presence of an acid binding agent, and when an acid addition salt is required, the resulting compound of general Formula I is reacted with an organic or inorganic acid.

Suitable organic solvents, which are inert under the reaction conditions, which may be used for the reaction of the invention, are the aromatic hydrocarbons of the benzene series, e.g., benzene or toluene; examples of acid binding agents which may be used are strong organic bases, e.g., N-methyl-piperidine, or strong inorganic bases, e.g. alkali metal amides or hydroxides, such as potassium or sodium amide or hydroxide. The compound of general Formula II is preferably first converted into its alkali metal salt by reacting with an alkali metal amide and is used in this form for further reaction.

After the reaction has been completed, the unused portions of the alkali metal amide must be decomposed by the addition of ammonium chloride. The reaction is effected at a temperature between 50° C. and the boiling temperature of the solution and has a duration of 2 to 10 hours.

One preferred method of effecting the process of the invention consists in that a compound of general Formula II is heated to the boil at reflux with sodium amide in tolune for 3 hours, a compound of general Formula III dissolved in tolune or in another inert organic solvent is subsequently added during the course of one hour while boiling is continued and the reaction mixture is allowed to boil for a further 4 hours to complete the reaction. After the reaction has been completed, the reaction mixture is cooled, ammonium chloride is added to decompose the excess sodium amide, the reaction mixture is washed out with water, and the compound of general Formula I is extracted from the organic phase with an aqueous acid solution, e.g. an aqueous tartaric acid solution. The acid extract is made alkaline, whereupon the crude compound of general Formula I precipitates, and this is subsequently purified in manner known per se, e.g., by distillation in a high vacuum, chromatography and/or recrystallization, and is then optionally converted into its acid addition salts in manner known per se.

The compounds of general Formula II used as starting materials are new.

The present invention further provides compounds of general Formula IIa,

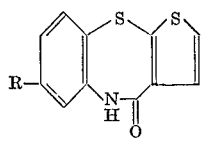

IIa in which R signifies a hydrogen, chlorine, bromine or iodine atom, an alkyl, alkoxy, alkylthio, alkylsulphonyl or alkyl sulphinyl radical having from 1 to 4 carbon atoms, the trifluoromethyl or cyano radical.

The present invention also provides a process for the production of compounds of general Formula IIa, characterized in that a compound of general Formula VII,

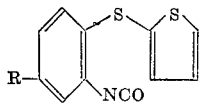

VII in which R has the above significance, is subjected to a ring closure.

The ring closure of a compound of general Formula VII is preferably effected with polyphosphoric acid. For this purpose the above starting materials are heated to 100–150° C. for ½ to 10 hours.

Another method of effecting the ring closure of the compounds of general Formula VII, with the exception of those compounds in which R signifies an alkylsulphinyl radical, consists in heating the compound to a temperature between 80° and 150° C. for ½ to 5 hours, in an organic solvent which is inert under the reaction conditions, e.g., o-dichlorobenzene, in the presence of aluminum chloride.

It should be pointed out, that this method of ring closure may not be used in the case where R is alkylsulphinyl, as under these conditions, undesired side reactions of the alkylsulphinyl radical may occur, e.g., reduction of the alkylmercapto group, or oxidation to the more stable alkylsulphonyl group.

However, 7 - alkylsulphinyl-4,5-dihydrothieno[2,3-b][1,5]benzothiazepin - 4 - one, in which the alkyl radical contains from 1 to 4 carbon atoms, may also be obtained in that 7 - alkylthio - 4,5 - dihydrothieno[2,3-b]benzothiazepin-4-one, in which alkyl has the above significance, is oxidized with the calculated amounts of hydrogen peroxide or an alkali metal periodate.

After the reaction has been completed, the reaction mixture is poured into ice water; when the ring closure is effected in a solvent, e.g., o-dichloro-benzene, the solvent is removed, e.g., by steam distillation, or when the ring closure is effected with polyphosphoric acid, the aqueous mixture is made neutral, e.g., with ammonia, the resulting compound of general Formula I is filtered off and purified in manner known per se, e.g., by recrystallization.

7 - alkylsulphinyl-4,4-dihydrothieno[2,3-b][1,5] benzothiazepin-4-one is produced in accordance with the process indicated above in that 7-alkylthio-4,5-dihydrothieno [2,3-b][1,5]benzothiazepin - 4 - one is first converted by reaction with a suitable acylating agent, e.g., an acid anhydride or acid halide into the corresponding 5-acyl compound and this is subsequently treated in an organic solvent which is inert under the reaction conditions, for example a lower alcohol, e.g., ethanol, with 1.5 to 2.0 mols of hydrogen peroxide for every mol of starting material at the boiling temperature of the solution or with a stoichiometric amount of an alkali metal periodate at room temperature. The resulting 7-alkylsulphinyl-4,5-dihydrothieno[2,3-b][1,5]benzothiazepin - 4 - one may be worked up, isolated and purified in manner known per se, as such when the acyl radical has already been split off during oxidation and after the corresponding saponification when the splitting off of the acyl radical has not occurred.

The compounds of general Formula VII are also new and together with the process for their production form part of the present invention. They may be produced in that a compound of general Formula IV,

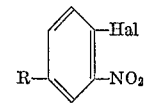

IV in which R has the above significance, and Hal signifies a chlorine or bromine atom, is reacted with 2-mercaptothiophene, preferably in a lower alcohol and in the presence of an acid binding agent, the resulting compound of general Formula V,

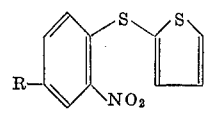

V in which R has the above significance, is reduced, e.g., with nascent sydrogen, to a compound of general Formula VI,

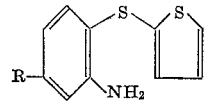

VI in which R has the above significance, and this is treated with phosgene in an organic solvent which is inert under the reaction conditions, e.g., an aromatic hydrocarbon, e.g., toluene, first at −10° to 0° C. for 1 to 2 hours and subsequently at the boiling temperature of the solution, to yield the desired compound of Formula VII.

The compounds of general Formula IIa are crystalline compounds at room temperature. Of the compounds IIa, those compounds defined by Formula II can be used as intermediates for the production of compounds I. The remaining compounds may be used in analogous manner as for the production of compounds I, for the production of the corresponding compounds, which compounds likewise have the utility hereinafter given for the compounds I.

The compounds of general Formula I are viscous or crystalline bases at room temperature; with organic or inorganic acids they form stable salts which are crystalline at room temperature. Examples of acids for acid addition salt formation are: hydrochloric, hydrobromic, sulphuric, fumaric, maleic, tartaric and methanesulphonic acid.

Compounds I are characterized by antidepressive properties, i.e., in tests effected with animals they inhibit the tetrabenazine ptosis and catalepsy and the hypothermia produced by reserpine. They exhibit central anticholinergic effects, but no peripheral anticholinergic effects and only very limited sedative properties. They have a antihistominic effect.

The compounds of the invention are indicated for use in the treatment of psychic depression conditions and psychosomatic illnesses. They may also be used as antihistaminics. A suitable daily dose of the compounds of general Formula I is 40 to 120 mg.

Of the compounds of general Formula I 5-(3-dimethylaminopropyl-1) - 4,5 - dihydrothieno[2,3-b][1,5]benzothiazepin-4-one is particularly useful.

The compounds of the invention may be used as pharmaceuticals on their own or in the form of appropriate medicinal preparations for administration, e.g., enterally or parenterally. In order to produce suitable medicinal preparations the compounds are worked up with organic or inorganic adjuvants which are inert and physiologically acceptable. Examples of such adjuvants are:

For tablets and dragées, lactose, starch, talc and stearic acid;

For syrups, solutions of cane sugar, invert sugar and glucose;

For injectable solutions, water, alcohols, glycerin and vegetable oils;

For suppositories, natural or hardened oils and waxes.

The preparations may furthermore contain suitable preserving, sabilizing and wetting agents, solubilizers, sweetening and colouring substances and flavourings.

Each of the above indicated pharmacologically effective compounds may be used, for example, for oral administration in the form of a tablet having the following composition; 1–3% of binding material (e.g., tragacanth), 3–10% of starch, 2–10% of talcum, 0.25–1 of magnesium stearate, the corresponding amount to active material and filling material, e.g., lactose, to make up 100%.

The term "in manner known per se" as used herein designates methods in use or described in the literature on the subject.

In the following nonlimitative examples all temperatures are indicated in degrees centigrade and are corrected.

EXAMPLE 1.—5-(2 - DIMETHYLAMINOETHYL-1)-4,5 - DIHYDROTHIENO[2,3 - b][1,5]BENZOTHIAZEPIN-4-ONE (a) 2-nitrophenyl-2-thienyl-sulphide 116 g. of 2-mercaptothiophene are added dropwise at room temperature to a solution of 40 g. of sodium hydroxide in 1 litre of methanol whilst stirring during the course of 15 minutes. After the addition of 157 g. of 2-chloronitrobenzene boiling at reflux is effected at a bath temperature of 90° for 6 hours. After cooling to 10° the resulting precipitate is filtered off and dried. After recrystallizing twice, each time from a 5-fold quantity of absolute ethanol, the pure 2-nitrophenyl-2-thienyl-sulphide, having a melting point of 79–81°, is obtained.

(b) 2-aminophenyl-2-thienyl-sulphide 165 cc. of 50% sulphuric acid are added dropwise at a bath temperature of 120° to a mixture of 500 g. of 2-nitrophenyl-2-thienyl-sulphide, 530 g. of iron powder, 730 cc. of isopropyl alcohol and 1200 cc. of water, whilst stirring during the course of 3 hours and the mixture is then allowed to react for one hour. After cooling to 60°, 1 litre of chloroform and 80 g. of sodium carbonate are added, the mixture is allowed to cool to room temperature and is then filtered. The chloroform layer which has been separated from the filtrate is washed out with 200 cc. of water, dried over potassium carbonate, filtered and concentrated. The evaporation residue is distilled in a high vacuum and the fraction which distils at 0.04 mm. of Hg and 105–115°, i.e., 2-aminophenyl-2-thienyl-sulphide, is collected.

(c) 2-isocyanatophenyl-2-thienyl-sulphide

A solution of 65 g. of 2-aminophenyl-2-thienyl-sulphide in 500 cc. of toluene is added dropwise at —5° to 0° during the course of approximately one hour to a solution of 60 g. of phosgene in 400 cc. of toluene, whilst passing a weak stream of phosgene through the solution. The reaction mixture is slowly heated to an oil bath temperature of 140° whilst phosgene is further passed through and boiling at reflux is effected for a further 15 minutes. Dry nitrogen gas is subsequently passed through the reaction mixture for about one hour to remove the excess phosgene. The reaction solution is concentrated by evaporation and distilled in a high vacuum. Pure 2-isocyanatophenyl-2-thienyl-sulphide distils over at 100°–110° and a pressure of 0.03 mm. of Hg.

(d) 4,5-dihydrothieno[2,3-b][1,5]benzothiazepin-4-one

A solution of 50 g. of 2-isocyanatophenyl-2-thienyl-sulphide in 200 cc. of o-dichlorobenzene is added dropwise at an internal temperature of 100° during the course of 15 minutes to a suspension of 25 g. of aluminum chloride in 200 cc. of o-dichlorobenzene and the mixture is allowed to react at an internal temperature of 150° for one hour. After the reaction has been completed, cooling is effected to 20°, the mixture is poured onto 500 g. of ice and then subjected to a steam distillation until all the o-dichlorobenzene has been distilled off. The distillation residue is filtered off, the filter residue is boiled with 300 cc. of acetone, filtered and dried. After crystallizing from a 10-fold amount by volume of dimethyl formamide, pure 4,5 - dihydrothieno[2,3-b][1,5]benzothiazepin-4-one, having a melting point of 280–282°, is obtained.

(e) 5-(2-dimethylaminoethyl-1)-4,5-dihydrothieno [2,3-b][1,5]benzothiazepin-4-one 6.02 g. of finely pulverized sodium amide are slowly added at room temperature whilst stirring to a mixture of 30 g. of 4,5-dihydrothieno[2,3-b][1,5]benzothiazepin-4-one and 250 cc. of absolute toluene and the resulting reaction mixture is subsequently boiled at a bath temperature of 150° for 3 hours. A solution of 16.6 g. of 2-dimethylamino-1-chloroethane in 20 cc. of absolute toluene is subsequently added dropwise during the course of one hour and the mixture is boiled for a further 4 hours to complete the reaction. After cooling, 10 g. of ammonium chloride are added and stirring is effected for a further 15 minutes. The reaction mixture is washed out with 75 cc. of water and then extracted with 250 cc. of a 15% aqueous tartaric acid solution. After washing out the tartaric acid extract twice, each time with 75 cc. of benzene, it is made alkaline with 60 cc. of concentrated caustic soda solution and the precipitated base is taken up in 300 cc. of benzene. The benzene extract is washed out with 100 cc. of water and concentrated. After concentrating by evaporation, distillation is effected in a high vacuum and the main fraction which distils at 180°–190° and 0.08 mm. of Hg is collected. The resulting 5-(2-dimethylaminoethyl-1)-4,5-dihydrothieno[2,3-b][1,5]benzothiazepin - 4-one is converted to one of its salts without further purification.

Hydrochloride: The hydrochloride is produced in that 30.3 g. of the distillate obtained above are dissolved in 250 cc. of absolute ethanol and a solution of hydrogen chloride in ethanol is added until an acid reaction to Congo red is obtained. After cooling well, the resulting precipitate is filtered off and crystallized from 500 cc. of absolute ethanol. The resulting pure 5-(2-dimethylaminoethyl - 1) - 4,5 - dihydrothieno[2,3-b][1,5]benzothiazepin-4-one hydrochloride has a melting point of 233–235°.

EXAMPLE 2.—5-(3-DIMETHYLAMINO - PROPYL-1)-4,5 - DIHYDROTHIENO[2,3 - b][1,5]BENZOTHIAZEPIN-4-ONE

The reaction and working up are effected in a manner analogous to that described in Example 1(e), using the following amounts: 30.0 g. of 4,5-dihydrothieno[2,3-b] [1,5]benzothiazepin-4-one, 6.02 g. of finely pulverized sodium amide, 250 cc. of absolute toluene and 18.75 g. of 3-dimethylamino-1-chloropropane in 20 cc. of absolute toluene. After concentrating the benzene solution by evaporation, the evaporation residue is distilled in a high vacuum and the main fraction which distils at 180°–200° and 0.01 mm. of Hg is collected. The resulting 5-(3 - dimethylamino-propyl-1) - 4,5-dihydrothieno [2,3-b][1,5]benzothiazepin-4-one is converted to one of its salts without further purification.

Maleate: The maleate is produced in that 30.8 g. of the distillate obtained above and 11.75 g. of maleic acid are dissolved at the boil in 180 cc. of absolute ethanol and cooling is then effected, whereby a precipitate results. After crystallization from 100 cc. of absolute ethanol, pure 5-(3-dimethylamino-propyl-1) - 4,5 - dihydrothieno [2,3-b][1,5]benzothiazepin-4-one maleate, having a melting point of 122–124°, is obtained.

EXAMPLE 3.—5 - [2-(1 - METHYL-PIPERIDYL-2)- ETHYL - 1]-4,5 - DIHYDROTHIENO[2,3-b][1,5] BENZOTHIAZEPIN-4-ONE

The reaction and working up are effected in a manner analogous to that described in Example 1(e), using the following amounts: 30.0 g. of 4,5-dihydrothieno[2,3-b][1,5]benzothiazepin-4-one, 6.02 g. of finely pulverized sodium amide, 250 cc. of absolute toluene and 24.9 g. of 2-(1-methyl-piperidyl-2)-1-chloroethane in 20 cc. of absolute toluene. After concentrating the benzene solution by evaporation the evaporation residue is distilled in a high vacuum and the main fraction which distils at 210°–215° and 0.01 mm. of Hg is collected. The resulting 5-[2-(1-methyl-piperidyl-2) - ethyl-1] - 4,5-dihydrothieno[2,3-b][1,5]benzothiazepin-4-one is converted to one of its salts without further purification.

Fumarate: The fumarate is produced in that 34.1 g. of the distillate obtained above and 11.6 g. of fumaric acid are dissolved at the boil in 200 cc. of absolute ethanol and cooling is subsequently effected, whereby a precipitate results. After crystallization from 100 cc. of absolute ethanol, pure 5-[2-(1-methyl - piperidyl)-2) - ethyl-1]- 4,5 - dihydrothieno[2,3-b][1,5]benzothiazepin - 4 - one fumarate, having a melting point of 99–104°, is obtained.

EXAMPLE 4.—5-[3-(1-METHYL - PIPERAZINYL-4)- PROPYL - 1]4,5 - DIHYDROTHIENO[2,3-b][1,5] BENZOTHIAZEPIN-4-ONE

The reaction and working up are effected in a manner analogous to that described in Example 1(e), using the following amounts: 25 g. of 4,5 - dihydrothieno[2,3-b] [1,5]benzothiazepin-4-one, 5.02 g. of finely pulverized sodium amide, 200 cc. of absolute toluene and 22.7 g. of 3-(1-methyl - piperazinyl-4) - 1-chloropropane in 20 cc. of absolute toluene. After concentrating the benzene solution by evaporation the evaporation residue is distilled in a high vacuum and the main fraction which distils at 215°–200° and 0.02 mm. of Hg is collected. The resulting 5-[3-(1-methyl - piperazinyl-4) - propyl-1]-4,5 - dihydrothieno[2,3-b][1,5]benzothiazepin-4-one is converted to one of its salts without further purification.

Dihydrochloride: The dihydrochloride is produced in that 13.76 g. of the distillate obtained above are dissolved in 100 cc. of absolute ethanol and a solution of hydrogen chloride in ethanol is added until an acid reaction to Congo red is obtained and cooling is effected, whereby a precipitate results. After crystallization from 200 cc. of ethanol, pure 5-[3-(1-methyl - piperazinyl-4) - propyl-1]- 4,5-dihydrothieno[2,3-b][1,5]benzothiazepin-4-one dihydrochloride, having a decomposition point of 245–247°, is obtained.

EXAMPLE 5.—7-CHLORO-5-(3-DIMETHYLAMINO- PROPLY - 1) - 4,5-DIHYDROTHIENO[2,3-b][1,5] BENZOTHIAZEPIN-4-ONE (a) 4-chloro-2-nitrophenyl-2-thienyl-sulphide 600 g. of 2-marcaptothiophene are added dropwise at room temperature whilst stirring during the course of 15 minutes to a solution of 207 g. of sodium hydroxide in 5200 cc. of methanol. A total of 992 g. of 2,5-dichloronitrobenzene is then added portionwise during the course of half an hour and the mixture is then boiled at reflux at a bath temperature of 90° for 5 hours. After cooling to 10°, filtration and drying are effected. After crystallizing twice, each time from a 3-fold quantity of absolute ethanol, pure 4-chloro - 2-nitrophenyl-2-thienyl-sulphide, having a melting point of 76–78°, is obtained.

(b) 4-chloro-2-aminophenyl-2-thienyl-sulphide 310 cc. of 20% sulphuric acid are added dropwise at a bath temperature of 120° whilst stirring during the course of one hour to a mixture of 443 g. of 4-chloro-2-nitrophenyl-2-thienyl-sulphide, 387 g. of iron powder, 300 cc. of isopropyl alcohol and 2000 cc. of water and the mixture is then allowed to react for 2 hours. After cooling to 60°, 1200 cc. of chloroform are added to the mixture. After further cooling to room temperature the mixture is filtered. The chloroform layer which has been separated from the filtrate is washed out with 200 cc. of water, dried over potassium carbonate, filtered and concentrated. The evaporation residue is crystallized twice, each time from a 3-fold quantity of low-boiling petroleum ether. The resulting pure 4 - chloro-2 - aminophenyl-2-thienyl-sulphide has a melting point of 46–48°.

(c) 4-chloro-2-isocyanatophenyl-2-thienyl-sulphide

A solution of 291 g. of 4-chloro-2-aminophenyl-2-thienyl-sulphide in 1900 cc. of toluene is added dropwise at −5° to 0° during the course of approximately one hour to a solution of 230 g. of phosgene in 1600 cc. of toluene, whilst passing a weak stream of phosgene through the solution. The reaction mixture is slowly heated to an oil bath temperature of 140° whilst phosgene is further passed through the boiling at reflux is effected for 15 minutes. Dry nitrogen gas is then passed through the reaction mixture for about one hour to remove excess phosgene. The reaction solution is concentrated by evaporation and distilled in a high vacuum. Pure 4-chloro-2-isocyanatophenyl-2-thienyl-sulphide distils at 140°–150° and a pressure of 0.01 mm. of Hg.

(d) 7-chloro-4,5-dihydrothieno[2,3-b][1,5]benzo- thiazepin-4-one

A solution of 240 g. of 4-chloro-2-isocyanatophenyl-2-thienyl-sulphide in 850 cc. of o-dichlorobenzene is added dropwise at an internal temperature of 100° during the course of 15 minutes to a suspension of 105 g. of aluminium chloride in 850 cc. of o-dichlorobenzene and the resulting mixture is allowed to react at an internal temperature of 150° for one hour. After cooling to 20°, the reaction mixture is poured onto 1000 g. of ice and subjected to a steam distillation until all the o-dichlorobenzene has been removed. The distillation residue is filtered off, the filter residue is boiled with 1.4 litres of acetone, filtered off and dried. After crystallizing from a 5-fold quantity of dimethyl formamide, pure 7-chloro-4,5-dihydrothieno[2,3-b][1,5]benzothiazepin-4-one, having a melting point of 297–299°, is obtained.

(e) 7-chloro-5-(3-dimethylamino-propyl-1)-4,5-dihy- drothieno[2,3-b][1,5]benzothiazepin-4-one The reaction and working up are effected in a manner analogous to that described in Example 1(e), using the following amounts: 25.0 g. of 7-chloro-4,5-dihydrothieno[2,3-b][1,5]benzothiazepin-4-one, 4.38 g. of finely pulverized sodium amide, 200 cc. of absolute toluene and 13.63 g. of 3-dimethylamino-1-chloropropane in 15 cc. of absolute toluene. After removing the benzene by evaporation, the evaporation residue is distilled in a high vacuum and the main fraction which distils at 195°–210° and 0.04 mm. of Hg is collected. After crystallizing the distillate twice, pure 7-chloro-5-(3-dimethylamino-propyl - 1) - 4,5 - dihydrothieno[2,3-b][1,5]benzothiazepin-4-one, having a melting point of 100–102°, is obtained.

EXAMPLE 6.—DESCRIPTION OF A TABLET COMPOSITION

| | G. |
|---|---|
| 5 - (3 - dimethylamino - propyl - 1) - 4,5 - dihydro- thieno[2,3-b]1,5]benzothiazepin-4-one | 33 |
| Tragacanth | 2 |
| Lactose | 56.5 |
| Maize starch | 5 |
| Talcum | 3 |
| Magnesium stearate | 0.5 |

Alcohol SD–30, distilled water, the necessary amounts.

The weight of the tablets produced depends on the dose of active compound to be administered.

EXAMPLE 7.—7-METHYL-4,5-DIHYDROTHIENO[2,3-b][1,5]BENZOTHIAZEPIN-4-ONE (a) 4-methyl-2-nitrophenyl-2-thienyl-sulphide 453 g. of 2-mercaptothiophene are first added during the course of 15 minutes to a solution of 186 g. of sodium hydroxide in 3.9 litres of methanol at room temperature whilst stirring, followed by the addition of 668 g. of 4-chloro-3-nitrotoluene during the course of half an hour. The mixture is subsequently boiled at reflux at a bath temperature of 90° for 5 hours. After cooling to 10°, filtration, washing out with cold methanol and water and drying are effected. After crystallizing from a 3-fold quantity of absolute ethanol, pure 4-methyl-2-nitrophenyl-2-thienyl-sulphide, having a melting point of 80–82°, is obtained.

(b) 4-methyl-2-aminophenyl-2-thienyl-sulphide 290 cc. of 20% sulphuric acid are added dropwise during the course of one hour whilst stirring to a boiling mixture of 380 g. of 4-methyl-2-nitrophenyl-2-thienyl-sulphide, 358 g. of iron powder, 250 cc. of isopropyl alcohol and 1.65 litres of water and boiling is effected for a further 3 hours. After cooling to 60°, 1 litre of chloroform is added and filtration is effected at room temperature. The chloroform layer which has been separated from the filtrate is washed out with 200 cc. of water, dried over potassium carbonate and concentrated by evaporation. The evaporation residue is distilled in a high vacuum. The main fraction distils at 130–139° and 0.08 mm. of Hg and is pure 4-methyl-2-aminophenyl-2-thienyl-sulphide.

(c) 4-methyl-2-isocyanatophenyl-2-thienyl-sulphide

A solution of 454 g. of 4-methyl-2-aminophenyl-2-thienyl-sulphide in 2.9 litres of toluene is added dropwise at −5° to 0° during the course of approximately one hour, to a solution of 399 g. of phosgene in 2.6 litres of toluene whilst passing a weak stream of phosgene through the solution. The reaction mixture is slowly heated to an oil bath temperature of 140° and boiled at reflux for 15 minutes whilst phosgene is further passed through the mixture. Dry nitrogen gas is subsequently passed through the reaction mixture for about one hour to remove the excess phosgene. The reaction solution is concentrated by evaporation and distilled in a high vacuum. Pure 4-methyl-2-isocyanatophenyl-2-thienyl-sulphide distils at 126–136° and a pressure of 0.01 mm. of Hg.

(d) 7-methyl-4,5-dihydrothieno[2,3-b][1,5]-benzothiazepin-4-one

A solution of 486 g. of 4-methyl-2-isocyanatophenyl-2-thienyl-sulphide in 1.8 litres of o-dichlorobenzene is added dropwise at an internal temperature of 100° during the course of 15 minutes to a suspension of 228 g. of aluminium chloride in 1.8 litres of o-dichlorobenzene and the mixture is allowed to react at an internal temperature of 150° for one hour. The reaction mixture is poured on 1000 g. of ice at 20° and subjected to a steam distillation until all the o-dichlorobenzene has been removed. The distillation residue is filtered off, the filter residue is boiled with 2.7 litres of acetone, filtered off and dried. After crystallizing from a 4-fold quantity of dimethyl formamide, pure 7-methyl-4,5-dihydrothieno[2,3-b][1,5]-benzothiazepin-4-one, having a melting point of 257–259°, is obtained.

EXAMPLE 8.—7-bromo-4,5-dihydrothieno[2,3-b]-[1,5]benzothiazepin-4-one (a) 4-bromo-2-nitrophenyl-2-thienyl-sulphide The reaction and working up are effected in a manner analogous to that described in Example 7(a), using the following amounts: 69.3 g. of sodium hydroxide, 1750 cc. of methanol, 201 g. of 2-mercapto-thiophene and 486 g. of 2,5-dibromonitrobenzene. After crystallization from ethanol, pure 4-bromo-2-nitrophenyl-2-thienylsulphide has a melting point of 61–63°.

(b) 4-bromo-2-aminophenyl-2-thienyl-sulphide

The reaction and working up are effected in a manner analogous to that described in Example 7(b), using the following amounts: 442 g. of 4-bromo-2-nitrophenyl-2-thienyl-sulphide, 331 g. of iron powder, 240 cc. of isopropyl alcohol and 1.6 litres of water. 280 cc. of 20% sulphuric acid are added dropwise. After crystallization from a 3-fold quantity of methanol, pure 4-bromo-2-aminophenyl-2-thienyl-sulphide has a melting point of 58–61°.

(c) 4-bromo-2-isocyanatophenyl-2-thienyl-sulphide

The reaction and working up are effected in a manner analogous to that described in Example 7(c), using the following amounts: 239 g. of phosgene are dissolved in 1.6 litres of toluene and 366 g. of 4-bromo-2-aminophenyl-2-thienyl-sulphide in 2 litres of toluene are added dropwise. Pure 4-bromo-2-isocyanatophenyl-2-thienyl sulphide has a boiling point of 135–145° at 0.05 mm. of Hg.

(d) 7-bromo-4,5-dihydrothieno[2,3-b][1,5]-benzothiazepin-4-one

The reaction and working up are effected in a manner analogous to that described in Example 7(d), using the following amounts: 132 g. of aluminium chloride are suspended in 1.1 litres of o-dichlorobenzene and 354 g. of 4-bromo-2-isocyanatophenyl-2-thienyl-sulphide in 1.1 litres of o-dichlorobenzene are added dropwise. After crystallizing from a 6-fold quantity of dimethyl formamide, pure 7-bromo-4,5-dihydrothieno[2,3-b][1,5]benzothiazepin-4-one, having a melting point of 309–311°, is obtained.

EXAMPLE 9.—7-methoxy-4,5-dihydrothieno-[2,3-b][1,5]benzothiazepin-4-one (a) 4-methoxy-2-nitrophenyl-2-thienyl-sulphide A solution of 66 g. of sodium hydroxide and 192 g. of 2-mercaptothiophene in 830 cc. of methanol is added at room temperature whilst stirring during the course of half an hour to a suspension of 310 g. of 4-chloro-3-nitroanisole in 830 cc. of methanol and the mixture is boiled at reflux for 22 hours. After cooling to room temperature, 1.5 litres of water and 500 cc. of chloroform are added, thorough shaking is effected, the chloroform layer is separated, washed out with water, dried and concentrated by evaporation. The evaporation residue is distilled in a high vacuum at 0.04 mm. of Hg and the fraction which distils at 150 to 170° is collected. Crystallization is effected from a 4-fold quantity of absolute ethanol, whereby pure 4-methoxy-2-nitrophenyl-2-thienyl-sulphide, having a melting point of 64–65°, is obtained.

(b) 4-methoxy-2- aminophenyl-2- thienyl-sulphide

The reaction and working up are effected in a manner analogous to that described in Example 7(b), using the following amounts: 311 g. of 4-methoxy-2-nitrophenyl-2-thienyl-sulphide, 276 g. of iron powder, 185 cc. of isopropyl alcohol and 1.3 litres of water. 220 cc. of 20% sulphuric acid are added dropwise. 4 - methoxy-2-aminophenyl-2-thienyl-sulphide has a boiling point of 145–155° at 0.03 mm. of Hg.

(c) 4-methoxy-2-isocyanatophenyl-2-thienyl-sulphide

The reaction and working up are effected in a manner analogous to that described in Example 7(c), using the following amounts: 178 g. of phosgene are dissolved in 1.2 litres of toluene and 220 g. of 4-methoxy-2-aminophenyl-2-thienyl-sulphide in 1.5 litres of toluene are added dropwise. Pure 4 - methoxy-2-isocyanatophenyl-2-thienyl-sulphide has a boiling point of 140–150° at 0.03 mm. of Hg.

(d) 7-methoxy-4,5-dihydrothieno[2,3-b][1,5] benzothiazepin-4-one

A mixture of 27 g. of 4-methoxy-2-isocyanatophenyl-2-thienyl-sulphide and 270 g. of polyphosphoric acid is heated at a bath temperature of 130° whilst stirring for 40 minutes. The reaction solution is subsequently poured into 1.5 litres of ice water, is made neutral with ammonia and filtered. After crystallizing thrice from acetone, pure 7-methoxy - 4,5 - dihydrothieno[2,3-b][1,5]benzothiazepin-4-one, having a melting point of 210–212°, is obtained.

EXAMPLE 10.—7-METHYLTHIO-4,5-DIHYDRO-THIENO[2,3-b][1,5]BENZOTHIAZEPIN-4-ONE

(a) 4-methylthio-2-nitrophenyl-2-thienyl-sulphide

The reaction and working up are effected in a manner analogous to that described in Example 7(a), using the following amounts: 207 g. of sodium hydroxide, 5.2 litres of methanol, 600 g. of 2-mercapto-thiophene and 1285 g. of 4-bromo-3-nitrothioanisole. After crystallization from a 12-fold quantity of absolute ethanol, pure 4-methylthio-2-nitrophenyl-2-thienyl-sulphide has a melting point of 80–82°.

(b) 4-methylthio-2-aminophenyl-2-thienyl-sulphide

The reaction and working up are effected in a manner analogous to that described in Example 7(b), using the following amounts: 461 g. of 4-methylthio-2-nitrophenyl-2-thienyl-sulphide, 387 g. of iron powder, 300 cc. of isopropyl alcohol and 2 litres of water. 310 cc. of 20% sulphuric acid are added dropwise. Pure 4-methylthio-2-aminophenyl-2-thienyl-sulphide has a boiling point of 172–182° at 0.04 mm. of Hg.

(c) 4-methylthio-2-isocyanatophenyl-2-thienyl-sulphide

The reaction and working up are effected in a manner analogous to that described in Example 7(c), using the following amounts: 231 g. of phosgene are dissolved in 1.5 litres of toluene and 305 g. of 4-methylthio-2-aminophenyl-2-thienyl-sulphide in 1.9 litres of toluene are added dropwise. Pure 4-methylthio-2-isocyanatophenyl-2-thienyl-sulphide has a boiling point of 165–173° at 0.02 mm. of Hg.

(d) 7-methylthio-4,5-dihydrothieno[2,3-b][1,5] benzothiazepin-4-one

The reaction and working up are effected in a manner analogous to that described in Example 7(d), using the following amounts: 133 g. of aluminium chloride are suspended in 1.1 litres of o-dichlorobenzene and 310 g. of 4-methylthio-2-isocyanatophenyl-2-thienyl-sulphide in 1.1 litres of o-dichlorobenzene are added dropwise. After crystallizing from a 2-fold quantity of dimethyl formamide, pure 7-methylthio-4,5-dihydrothieno[2,3-b][1,5]-benzothiazepin-4-one, having a melting point of 211–213°, is obtained.

EXAMPLE 11.—7-METHYLSULPHONYL-4,5-DIHYDROTHIENO[2,3-b][1,5]BENZOTHIAZEPIN-4-ONE

(a) 4-methylsulphonyl-2-nitrophenyl-2-thienyl-sulphide

A solution of 40 g. of sodium hydroxide and 116 g. of 2-mercaptothiophene in 800 cc. of ethanol is added dropwise whilst stirring during the course of half an hour to a boiling mixture of 235 g. of 4-chloro-3-nitro-methyl-sulphonyl-benzene in 3 litres of ethanol. The mixture is allowed to react for 3½ hours. Filtration and drying are effected at room temperature. After crystallization from a 4-fold quantity of ethanol, pure 4-methylsulphonyl-2-nitrophenyl-2-thienyl-sulphide, having a melting point of 178°–180°, is obtained.

(b) 4-methylsulphonyl-2-aminophenyl-2-thienyl-sulphide

The reaction and working up are effected in a manner analogous to that described in Example 7(b), using the following amounts: 355 g. of 4-methylsulphonyl-2-nitrophenyl-2-thienyl-sulphide, 283 g. of iron powder, 190 cc. of isopropyl alcohol and 1.3 litres of water. 230 cc. of 20% sulphuric acid are added dropwise. After crystallizing from a 4-fold quantity of ethanol, pure 4-methylsulphonyl - 2 - aminophenyl-2-thienyl-sulphide, having a melting point of 70–72°, is obtained.

(c) 4-methylsulphonyl-2-isocyanatophenyl-2-thienyl-sulphide

The reaction and working up are effected in a manner analogous to that described in Example 7(c), using the following amounts: 100 g. of phosgene are dissolved in 700 cc. of toluene and 153 g. of 4-methylsulphonyl-2-aminophenyl-2-thienyl-sulphide in 1.6 litres of toluene are added dropwise. The crude 4-methylsulphonyl-2-isocyanatophenyl-2-thienyl-sulphide obtained as evaporation residue is worked up further as such.

(d) 7-methylsulphonyl-4,5-dihydrothieno[2,3-b][1,5] benzothiazepin-4-one

A mixture of 70.3 g. of 4-methylsulphonyl-2-isocyanatophenyl-2-thienyl-sulphide and 710 g. of polyphosphoric acid is heated at an oil bath temperature of 120° whilst stirring for one hour. The reaction solution is subsequently poured into 2.1 litres of ice water, made neutral with ammonia and filtered. After crystallizing from a 5-fold quantity of glacial acetic acid and then from a 10-fold quantity of a mixture of 8 parts of ethanol and 2 parts of dimethyl formamide, pure 7-methylsulphonyl - 4,5 - dihydrothieno[2,3-b][1,5]benzothiazepin-4-one, having a melting point of 218–220°, is obtained.

EXAMPLE 12.—7-CYANO-4,5-DIHYDROTHIENO-[2,4-b][1,5]BENZOTHIAZEPIN-4-ONE

(a) 4-cyano-2-nitrophenyl-2-thienyl-sulphide

A solution of 13.3 g. of sodium hydroxide and 38.7 g. of 2-mercaptothiophene in 170 cc. of methanol is added dropwise during the course of 45 minutes whilst stirring to a boiling mixture of 60.8 g. of 4-chloro-3-nitrobenzonitrile in 170 cc. of methanol. The mixture is allowed to react for a further 5½ hours. Filtration and drying are effected at room temperature. After crystallizing from absolute ethanol, pure 4-cyano-2-nitrophenyl-2-thienyl-sulphide, having a melting point of 137–139°, is obtained.

(b) 4-cyano-2-aminophenyl-2-thienyl-sulphide

The reaction and working up are effected in a manner analogous to that described in Example 7(b), using the following amounts: 274 g. of 4-cyano-2-nitrophenyl-2-thienyl-sulphide, 263 g. of iron powder, 500 cc. of isopropyl alcohol and 1.7 litres of water. 210 cc. of 20% sulphuric acid are added dropwise. The chloroform evaporation residue is distilled in a high vacuum. Pure 4-cyano-2-aminophenyl-2-thienyl-sulphide has a boiling point of 165–175° at 0.07 mm. of Hg.

(c) 4-cyano-2-isocyanatophenyl-2-thienyl-sulphide

The reaction and working up are effected in a manner analogous to that described in Example 7(c), using the following amounts: 157 g. of phosgene are dissolved in 1.1 litres of toluene and 190 g. of 4-cyano-2-aminophenyl-2-thienyl-sulphide in 1.3 litres of toluene are added dropwise. Pure 4 - cyano - 2-isocyanatophenyl-2-thienylsulphide has a boiling point of 145–155° to 0.06 mm. of Hg.

(d) 7-cyano-4,5-dihydrothieno[2,3-b][1,5] benzothiazepin-4-one

The reaction and working up are effected in a manner analogous to that described in Example 7(d), using the following amounts: 11.4 g. of aluminum chloride are suspended in 75 cc. of o-dichlorobenzene and 20 g. of 4- cyano - 2 - isocyanatophenyl - 2 - thienyl-sulphide in 75 cc. of o-dichlorobenzene are added dropwise. After crystallizing from a 7-fold quantity of dimethyl formamide, pure 7 - cyano - 4,5 - dihydrothieno[2,3-b][1,5]benzothiazepin-4-one, having a melting point of 339–341°, is obtained.

Example 13—7-trifluoromethyl-4,5-dihydrothieno [2,3-b][1,5]benzothiazepin-4-one (a) 4-trifluoromethyl-2-nitrophenyl-2-thienyl-sulphide A solution of 17.8 g. of sodium hydride and 51.6 g. of 2-mercaptothiophene in 225 cc. of methanol is added dropwise whilst stirring during the course of half an hour to a boiling solution of 100 g. of 4-chloro-3-nitro-trifluoromethyl-benzene in 225 cc. of methanol. The mixture is allowed to react for a further 4 hours. Filtration is effected at room temperature, the filtrate is concentrated in a vacuum, the residue dissolved in 500 cc. of chloroform, washed out with water and again concentrated by evaporation. The evaporation residue is distilled in a high vacuum and the fraction which distils at 115°–120° and 0.03 mm. of Hg is collected. After crystallizing from a 2-fold quantity of isopropyl alcohol, pure 4-trifluoromethyl-2-nitrophenyl-thienyl-sulphide, having a melting point of 48–49°, is obtained.

(b) 4-trifluoromethyl-2-aminophenyl-2-thienyl-sulphide

The reaction and working up are effected in a manner analogous to that described in Example 7(b), using the following amounts: 244 g. of 4-trifluoromethyl-2-nitrophenyl-2-thienyl-sulphide, 204 g. of iron powder, 190 cc. of isopropyl alcohol and 1.3 litres of water. 200 cc. of 20% sulphuric acid are added dropwise. The chloroform evaporation residue is distilled in a high vacuum. Pure 4 - trifluoromethyl - 2 - aminophenyl - 2 - thienyl-sulphide has a boiling point of 98–103° at 0.05 mm. of Hg.

(c) 4-trifluoromethyl-2-isocyanatophenyl-2-thienyl-sulphide

The reaction and working up are effected in a manner analogous to that described in Example 7(c), using the following amounts: 135 g. of phosgene are dissolved in 930 cc. of toluene and 193 g. of 4-trifluoromethyl-2-aminophenyl-2-thienyl-sulphide in 1.2 litres of toluene are added dropwise. Pure 4-trifluoromethyl-2-isocyanatophenyl-2-thienyl-sulphide has a boiling point of 95–100° at 0.03 mm. of Hg.

(d) 7-trifluoromethyl-4,5-dihydrothieno[2,3-b][1,5] benzothiazepin-4-one

A mixture of 20 g. of 4-trifluoromethyl-2-isocyanatophenyl-2-thienyl-sulphide and 200 g. of polyphosphoric acid at an oil bath temperature of 110° whilst stirring for 5 hours. The reaction solution is subsequently poured into 600 cc. of ice water, made neutral with ammonia and filtered. After crystallizing from a 2-fold quantity of dimethyl formamide, pure 7-trifluoromethyl-4,5-dihydrothieno[2,3-b][1,5]benzothiazepin-4-one, having a melting point of 263–265°, is obtained.

Example 14—7-methylsulphinyl-4,5-dihydrothieno [2,3-b][1,5]benzothiazepin-4-one (a) methylthio-5-acetyl-4,5-dihydrothieno[2,3-b][1,5] benzothiazepin-4-one 50.0 g. of 7-methylthio-4,5-dihydrothieno[2,3-b][1,5] benzothiazepin-4-one and 500 cc. of acetic acid anhydride are boiled at reflux for 3 hours and 250 cc. of acetic acid anhydride are then distilled oc. After the addition of a further 250 cc. of acetic acid anhydride boiling is continued for a further 2 hours and the mixture is completely concentrated by evaporation. After crystallizing the evaporation residue twice, each time from an 8-fold quantity of absolute ethanol, pure 7-methylthio-5-acetyl- 4,5 - dihydrothieno[2,3-b][1,5]benzothiazepin - 4 - one, having a melting point of 117–119°, is obtained.

(b) 7-methylsulphinyl-4,5-dihydrothieno[2,3-b][1,5] benzothiazepin-4-one 10 cc. of 40% hydrogen peroxide are added dropwise during the course of 2½ hours to a boiling solution of 20 g. of 7 - methylthio - 5-acetyl-4,5-dihydrothieno [2,3-b][1,5]benzothiazepin-4-one in 250 cc. of ethanol and boiling is effected for a further 3 hours. The solution is concentrated by evaporation, the evaporation residue is dissolved in 250 cc. of chloroform, is washed out with water and again concentrated by evaporation. After crystillizing from 75-fold quantity of methanol, pure 7-methylsulphinyl - 4,5-dihydrothieno[2,3-b][1,5]benzothiazepin-4-one, having a melting point of 241–243°, is obtained.

What is claimed is:
1. A composed selected from the group consisting of a compound of formula:

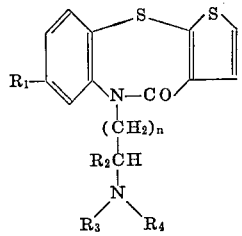

in which $R_1$ is hydrogen, chlorine, bromine or iodine, and either $n$ is 1 or 2, $R_2$ is hydrogen, and each of $R_3$ and $R_4$ is alkyl of 1 to 4 carbon atoms, or $R_3$ and $R_4$ together with the nitrogen are piperazinyl-4, which may optionally be substituted in the 1-position by alkyl of 1 to 4 carbon atoms, or $n$ is 2, and $R_4$ is alkyl of 1 to 4 carbon atoms, and $R_3$ together with $R_2$ are trimethylene or tetramethylene, and the pharmaceutically acceptable acid addition salts thereof.

2. A compound according to claim 1, in which the compound is 5-(2-dimethylamino-ethyl-1)-4,5-dihydrothieno[2,3-b][1,5]benzothiazepin-4-one.

3. A compound according to claim 1, in which the compound is 5-(3-dimethylamino-propyl-1)-4,5-dihydrothieno[2,3-b][1,5]benzothiazepin-4-one.

4. A compound according to claim 1, in which the compound is 5-[2-(1-methyl-piperidyl-2)-ethyl-1]-4,5-dihydrothieno[2,3-b][1,5]benzothiazepin-4-one.

5. A compound according to claim 1, in which the compound is 5-[3-(1-methyl-piperazinyl-4)-propyl-1]-4,5-dihydrothieno[2,3-b][1,5]benzothiazepin-4-one.

6. A compound according to claim 1, in which the compound is 7-chloro-5-(3-dimethylamino-propyl-1)-4,5-dihydrothieno[2,3-b][1,5]benzothiazepin-4-one.

7. A compound selected from the group consisting of a compound of formula:

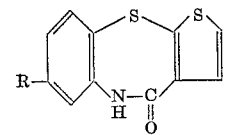

in which R is hydrogen, chlorine, bromine or iodine, alkyl, alkoxy, alkylthio, alkylsulphonyl or alkylsulphinyl, trifluoromethyl or cyano, said alkyl, alkoxy, alkylthio, alkylsulphonyl and alkyl sulphinyl groups each having from 1 to 4 carbon atoms.

8. A compound according to claim 7, in which the compound is 4,5-dihydrothieno[2,3-b][1,5]benzothiazepin-4-one.

9. A compound according to claim 7, in which the compound is 7-chloro-4,5-dihydrothieno[2,3-b][1,5]benzothiazepin-4-one.

10. A compound according to claim 7, in which the compound is 7-methyl-4,5-dihydrothieno[2,3-b][1,5]benzothiazepin-4-one.

11. A compound according to claim 7, in which the compound is 7-bromo-4,5-dihydrothieno[2,3-b][1,5]benzothiazepin-4-one.

12. A compound according to claim 7, in which the compound is 7-methoxy-4,5-dihydrothieno[2,3-b][1,5]benzothiazepin-4-one.

13. A compound according to claim 7, in which the compound is 7-methylthio-4,5-dihydrothieno[2,3-b][1,5-benzothiazepin-4-one.

14. A compound according to claim 7, in which the compound is 7-methylsulphonyl-4,5-dihydrothieno[2,3-b][1,5]benzothiazepin-4-one.

15. A compound according to claim 7, in which the compound is 7-cyano-4,5-dihydrothieno[2,3-b][1,5]benzothiazepin-4-one.

16. A compound according to claim 7, in which the compound is 7-trifluoromethyl-4,5-dihydrothieno[2,3-b][1,5]benzothiazepin-4-one.

17. A compound according to claim 7, in which the compound is 7-methylsulphinyl-4,5-dihydrothieno[2,3-b][1,5]benzothiazepin-4-one.

References Cited

UNITED STATES PATENTS 3,419,347  12/1968  Schmutz et al. _____ 260—239.3

HENRY R. JILES, Primary Examiner

R. T. BOND, Assistant Examiner

U.S. Cl. X.R.

260—329, 332.3, 332.5; 424—275

UNITED STATES PATENT OFFICE
CERTIFICATE OF CORRECTION

Patent No. 3,464,977                          September 2, 196

Jany Renz et al.

It is certified that error appears in the above identified patent and that said Letters Patent are hereby corrected as shown below:

Column 3, line 47, "[2,3-b]benzo-" should read -- [2,3-b][1.5]benzo --; line 59, "-alkylsulphinyl-4,4-" should read -- -alkylsulphinyl-4,5 --. Column 4, line 23, "sydrogen" should read -- hydrogen --; line 56, "antihisto-" should read -- high antihista- --. Column 12, line 35, "[2,4-b]" should read -- [2,3-b] --. Column 13, line 70, "oc" should read -- off --.

Signed and sealed this 5th day of May 1970.

(SEAL)
Attest:

Edward M. Fletcher, Jr.                     WILLIAM E. SCHUYLER, JR.
Attesting Officer                              Commissioner of Patents